(12) United States Patent
Townson et al.

(10) Patent No.: US 7,597,374 B1
(45) Date of Patent: Oct. 6, 2009

(54) HINGE AND CATCH ASSEMBLY FOR MOTOR VEHICLE ENDGATE SYSTEM

(75) Inventors: James M. Townson, Clarkston, MI (US); Michael K. Zelek, Canton, MI (US); Leonard J. Brohl, Jr., Ortonville, MI (US); Tanya J. Klain, Novi, MI (US); John B. Morley, Troy, MI (US); Sarah Pearson, Novi, MI (US); Patrick O. McGee, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/099,186

(22) Filed: Apr. 8, 2008

(51) Int. Cl.
*B62D 33/027* (2006.01)
(52) U.S. Cl. ........................................ 296/51
(58) Field of Classification Search .............. 296/50, 296/51, 57.1, 146.8, 146.12; 292/210, 216, 292/DIG. 29, 285; 49/192; 16/367, 226, 16/231, 297
See application file for complete search history.

(56) References Cited

U.S. PATENT DOCUMENTS

| | | | | |
|---|---|---|---|---|
| 3,387,406 A | * | 6/1968 | Coker et al. ............... | 49/192 |
| 3,454,299 A | * | 7/1969 | Hewitt et al. ............... | 296/50 |
| 3,592,504 A | * | 7/1971 | Sandor .................... | 296/70 |
| 4,076,301 A | * | 2/1978 | Gergoe .................... | 296/50 |
| 5,040,390 A | * | 8/1991 | Mistry et al. ............... | 70/241 |
| 7,201,423 B2 | * | 4/2007 | Ichinose ................... | 296/51 |
| 7,258,373 B2 | * | 8/2007 | Plett et al. ................ | 292/210 |
| 7,380,873 B2 | * | 6/2008 | Shoemaker .............. | 296/182.1 |

* cited by examiner

*Primary Examiner*—H Gutman

(57) ABSTRACT

An assembly for opening and closing a passageway into the body of a vehicle includes a post secured to the body at a lateral side of the passageway, an endgate for opening and closing the passageway and able to swing alternately about a lateral axis and an upright axis, a pivot support secured to the first post and aligned with the lateral axis, and a pivot secured to the endgate and aligned with the lateral axis, for alternately engaging and disengaging the pivot support, with the engagement supporting the endgate for pivoting about the lateral axis, and with the disengagement permitting the endgate to pivot about the upright axis.

8 Claims, 7 Drawing Sheets

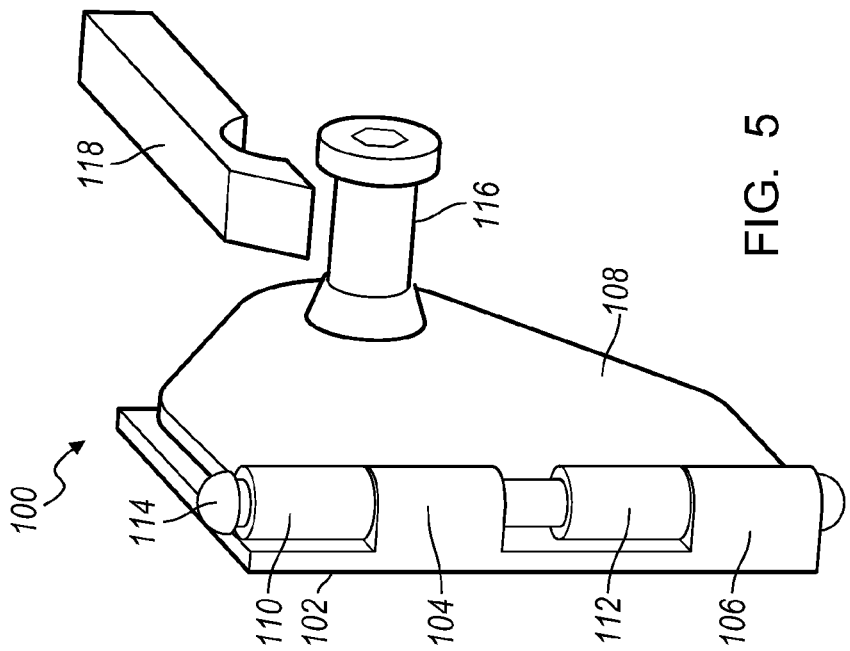
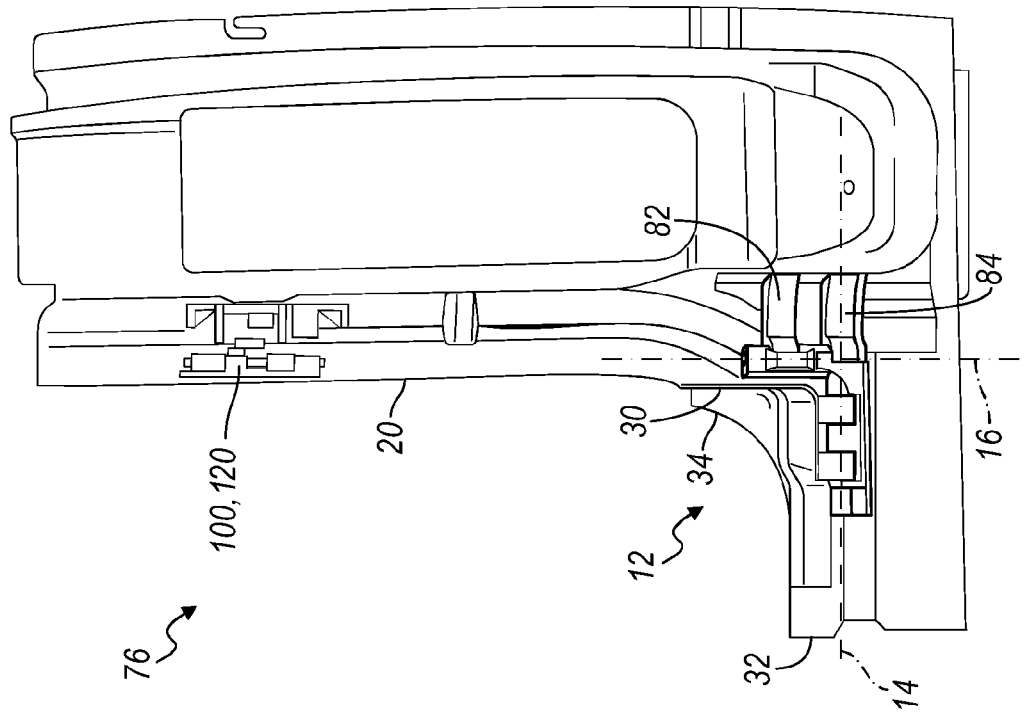
FIG. 4
FIG. 5

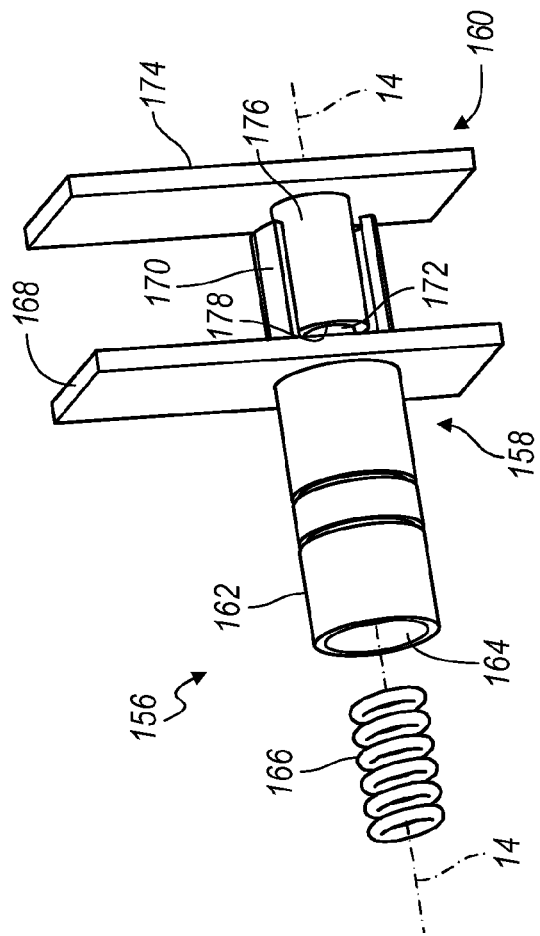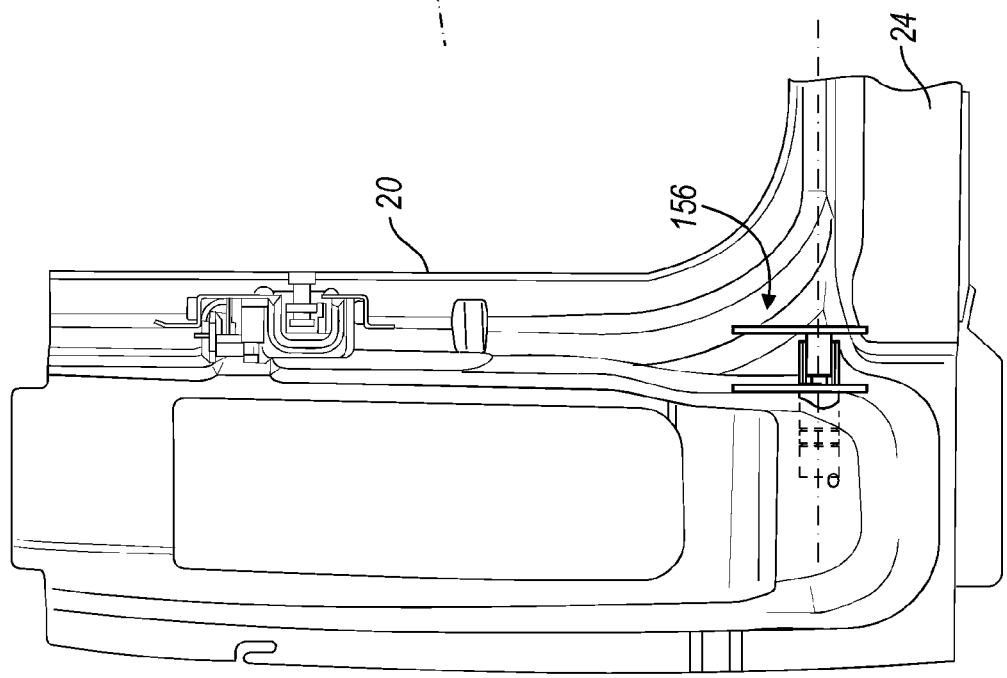
FIG. 10
FIG. 9

US 7,597,374 B1

HINGE AND CATCH ASSEMBLY FOR MOTOR VEHICLE ENDGATE SYSTEM

BACKGROUND OF INVENTION

This invention relates generally to an endgate for a motor vehicle, and, more particularly, to an endgate and hinge assembly that allows the endgate to swing alternately about a lateral axis and an upright axis.

The tailgate at the back of a wagon, truck, station wagon, etc., is usually hinged along a lateral axis at the bottom of the tailgate to pivot downward for convenience in loading or unloading cargo. A door at the back of a vehicle hinged along a lateral axis at the top to open upward is often referred to as a hatch or lift gate. In certain cases it is helpful and preferred that the vehicle has an endgate that can swing like a door about a vertical axis to facilitate access to the cargo area. A more recent need exists in the automotive industry for a hinge assembly that supports an endgate such that the gate can swing both upward and downward about a horizontal axis and like a door about a vertical axis at the option of the user.

SUMMARY OF INVENTION

An assembly for opening and closing a passageway into the body of a vehicle includes a post secured to the body at a lateral side of the passageway, an endgate for opening and closing the passageway and able to swing alternately about a lateral axis and an upright axis, a pivot support secured to the first post and aligned with the lateral axis, and a pivot secured to the endgate and aligned with the lateral axis, for alternately engaging and disengaging the pivot support, with the engagement supporting the endgate for pivoting about the lateral axis, and with the disengagement permitting the endgate to pivot about the upright axis.

A dual action hinge secured to the endgate and a second post includes a first hinge pin that supports the endgate for pivoting about the lateral axis, and a second hinge pin that supports the endgate for pivoting about the upright axis.

The dual action endgate hinge is able to pivot about two axes. The endgate pivot and pivot support is able to support the endgate about the lateral axis and to provide a detent function that resists disengagement of the endgate from the pivot support. The combination permits a conventional latch and striker for securing the endgate in a closed position to be replaced by the hinging and catch mechanism provided by the endgate pivot and pivot support with hardware that is simpler, has lower cost and is lower weight.

The assembly provides a robust, dual action hinging mechanism, which can be readily incorporated into or deleted from an endgate system at the option of a vehicle customer.

BRIEF DESCRIPTION OF DRAWINGS

FIG. 4 is an end view looking forward and showing the right-side, rear quarter panel, in which the dual action hinge assembly of FIG. 3 is installed;

FIG. 5 is a perspective view of a dual action hinge/striker;

FIG. 9 is an end view looking forward that shows the left-side, rear quarter panel having a dual action hinge/catch assembly installed; and FIG. 10 is a perspective view of the hinge/catch assembly.

DETAILED DESCRIPTION

Figure 1:
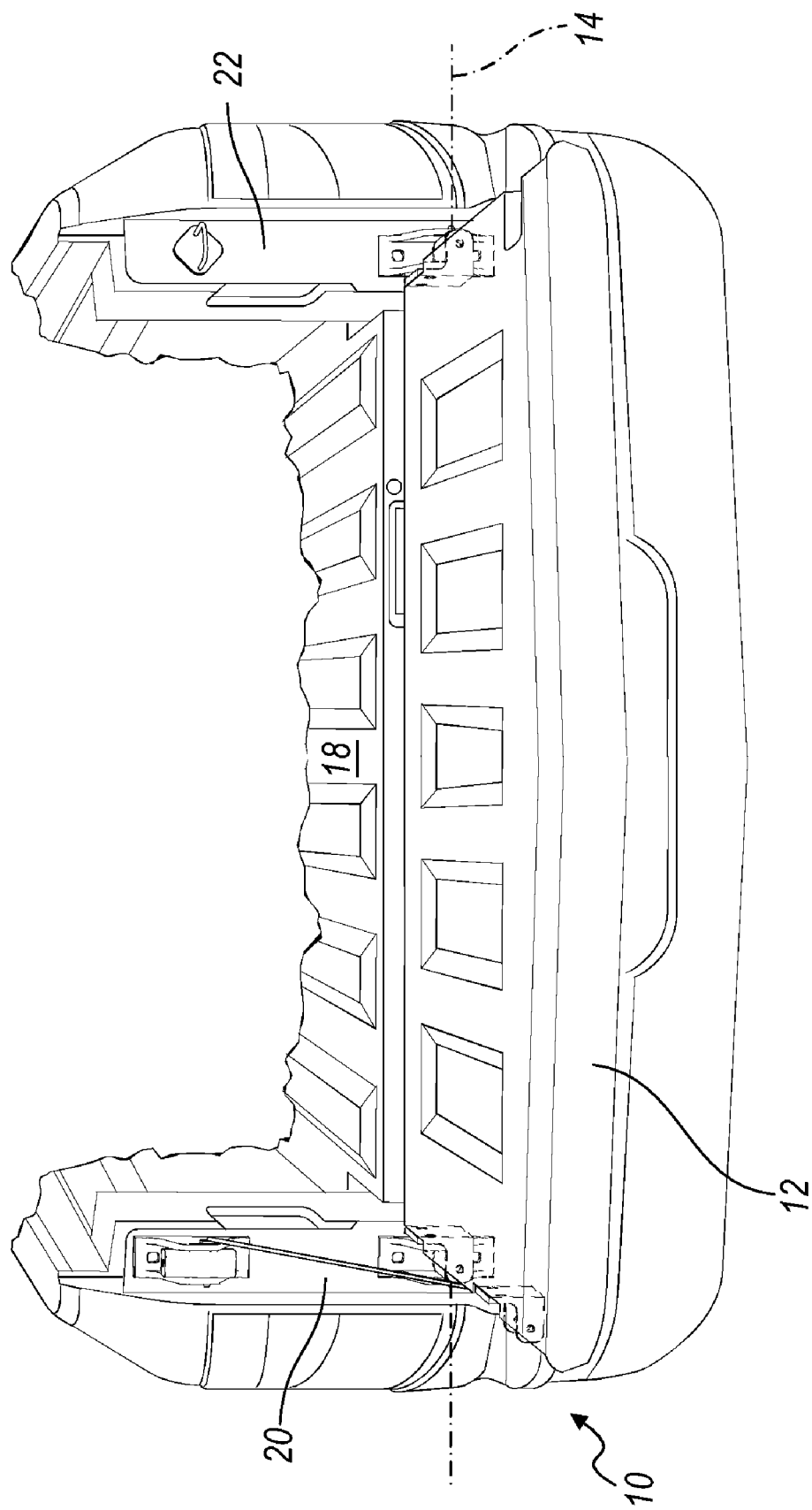
FIG. 1 is a rear view of a pickup truck showing the endgate opened about a lateral axis.
Figure 2:
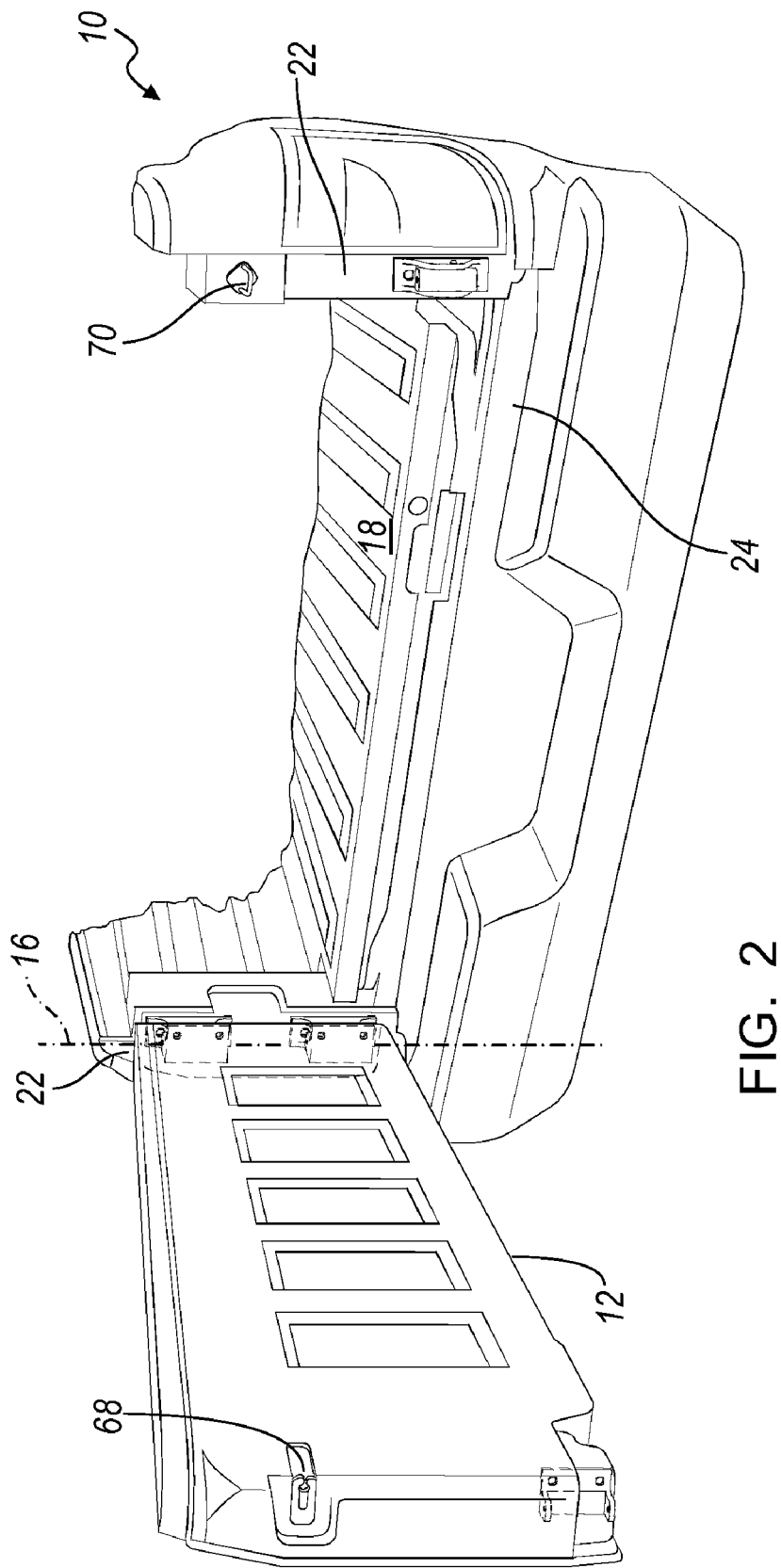
FIG. 2 is a rear view of the pickup truck showing the endgate opened about an upright axis.

Referring now to the drawings, there is illustrated in FIGS. 1 and 2 a pickup truck 10 whose endgate 12 is hinged both about a lateral axis 14 and an upright axis 16 for opening and closing access to the truck bed 18. The cargo opening is formed with a left-side post 20, a right-side post 22, and a rail interconnecting the posts 20, 22. Preferably, axis 14 is horizontal and axis 16 is vertical, although those axes may be skewed with respect to the horizontal and vertical planes.

Figure 3:
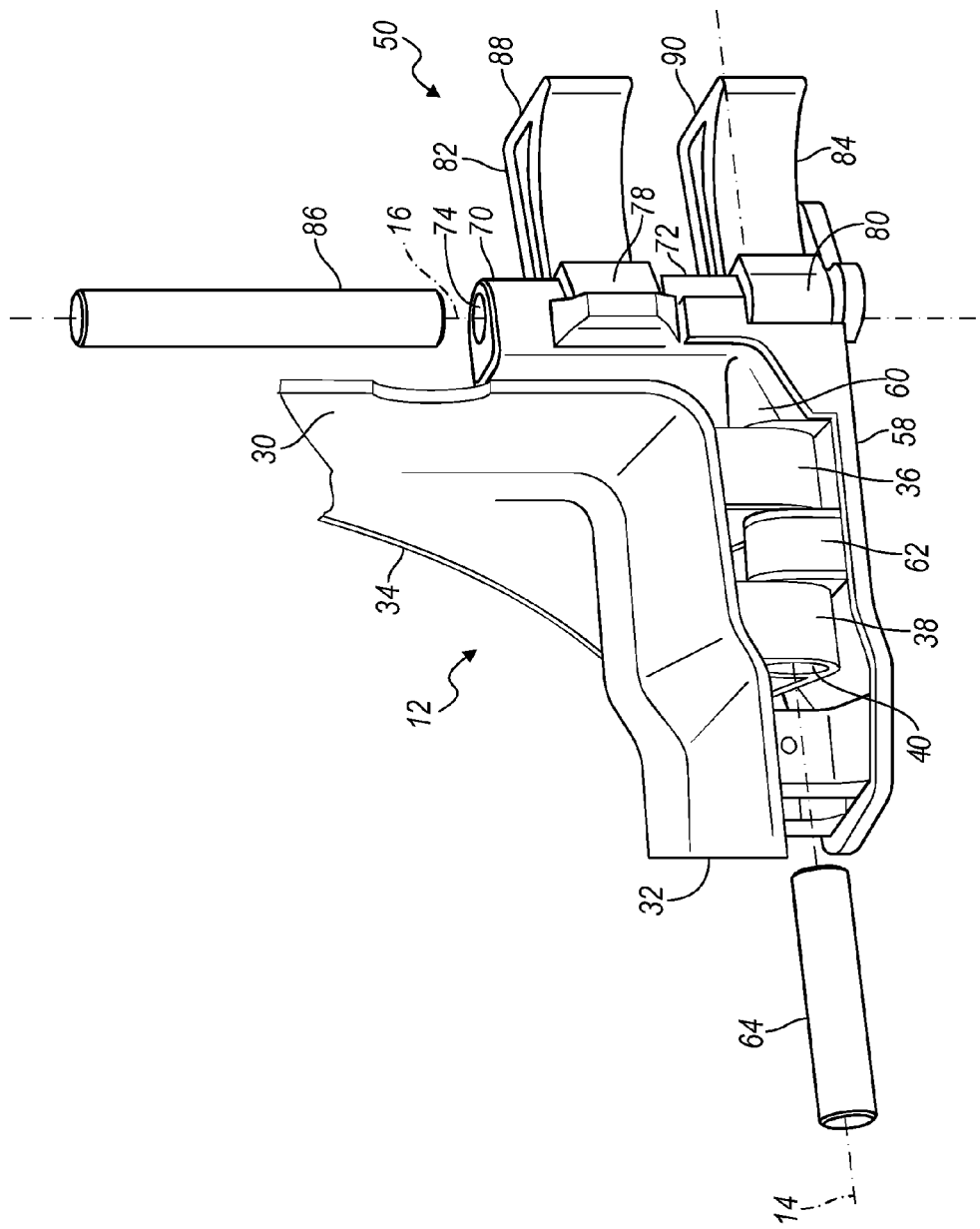
FIG. 3 is a perspective view of a portion of a dual action hinge secured to the endgate.

As shown in FIGS. 3 and 4, the endgate 12 is formed with a side leg 30, a lateral leg 32 and an end panel 34 secured to the legs 30, 32. The lower surface of the lower leg 32 is secured to two mutually spaced lugs 36, 38, each lug being formed with a laterally-directed circular cylindrical hole 40, each hole being aligned mutually and installed in the vehicle in alignment with lateral axis 14. The lugs 36, 38 may be formed integrally with the lower leg 32 or connected to the lower leg by mechanical fasteners, welding or bonding.

An endgate hinge 50 includes a lower plate 58, which extends laterally and is formed with two mutually spaced lugs 60, 62, each lug being formed with a laterally-directed circular cylindrical hole. The holes in lugs 60, 62 of hinge 50 are aligned mutually and are aligned with the holes 40 in lugs 38, 40 of the endgate 12. A hinge pin 64 is installed in the holes of the endgate lugs 36, 38 and the hole of the endgate hinge lugs 60, 62. The endgate hinge 50 is installed in the vehicle 10 such that the aligned holes of lugs 36, 38, 60, 62 are aligned also with lateral axis 14.

The endgate hinge 50 is formed with two mutually spaced lugs 70, 72, each lug being formed with a laterally-directed circular cylindrical hole 74 and secured to lower plate 58. The holes in lugs 70, 72 are aligned mutually and are aligned also with holes in lugs 78, 80, which are formed in upper and lower arms 82, 84. A second hinge pin 86 is installed in the holes of lugs 70, 72, 78, 80. The endgate hinge 50 is installed in the vehicle 10 such that the aligned holes of lugs 70, 72, 78, 80 are aligned with upright axis 16. Arms 82, 84 are formed to provide clearance with the endgate 12 as it pivots about the upright axis 16. The endgate 12, therefore, can pivot 90 degrees between its opened and closed positions.

The outer end 88 of arm 66 and the outer end 90 of arm 84 are secured to the right-side post 22, preferably by mechanical fasteners. Lugs 70, 72, lower plate 58 and lugs 60, 62 of hinge 50 and the lugs 36, 38 of endgate 12 pivot about axis 16 at pin 86 relative to the arms 66, 68 and post 20.

FIG. 5 illustrates an upper hinge/striker 100 that includes a gate-side strap or plate 102, which is secured preferably by mechanical fasteners to the side leg 30 of tailgate 12 and is formed with spaced lugs 104, 106. Hinge/striker 100 further includes a body-side strap or plate 108, which is formed with spaced lugs 110, 112 that alternate with the lugs of gate-side strap 108. Each of lugs 104, 106, 110, 112 is formed with a pin hole, into which is fitted a hinge pin 114. Hinge/striker 100 is installed in the vehicle at a higher elevation than dual action hinge 50 such that hinge pin 114 is aligned with axis 16 and pin 86. The outboard surface of plate 108 supports a striker 116, which extends laterally toward post 22. A latch 118, secured to post 22, resiliently and releasably engages striker 116 with an elastic force. When latch 118 and striker 100 are engaged, endgate 12 is in its closed position and their engagement secures the endgate against pivoting.

Figure 7:
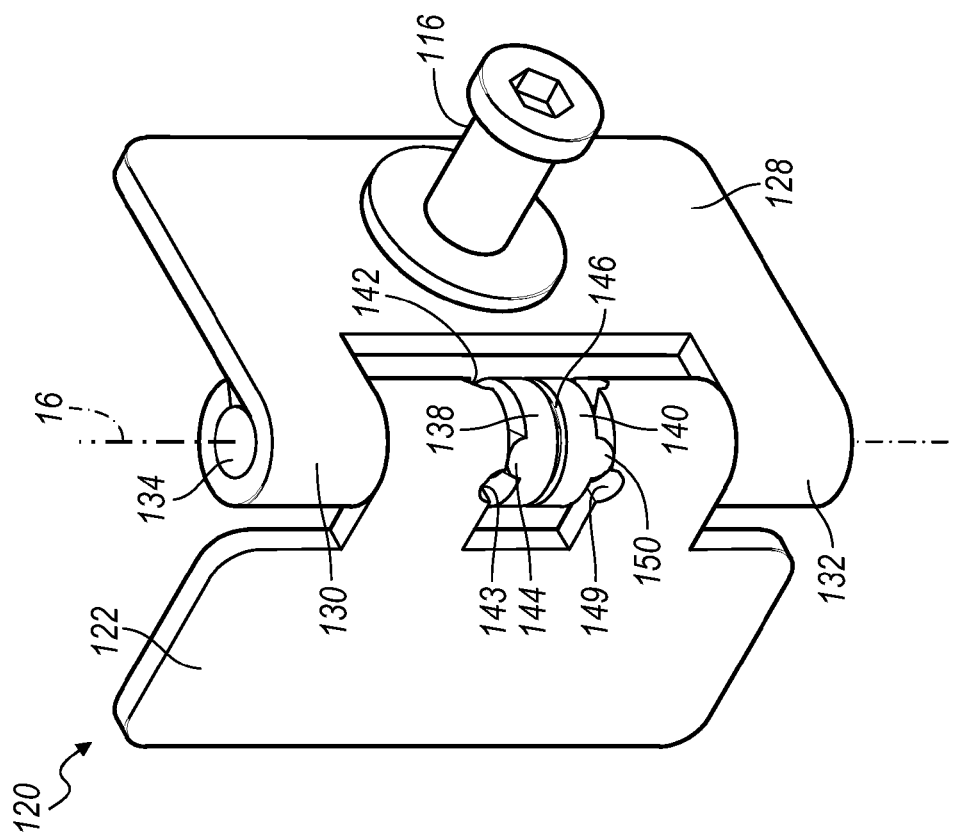
FIG. 7 is a perspective view of the dual action hinge/striker of FIG. 6 its open position.
Figure 6:
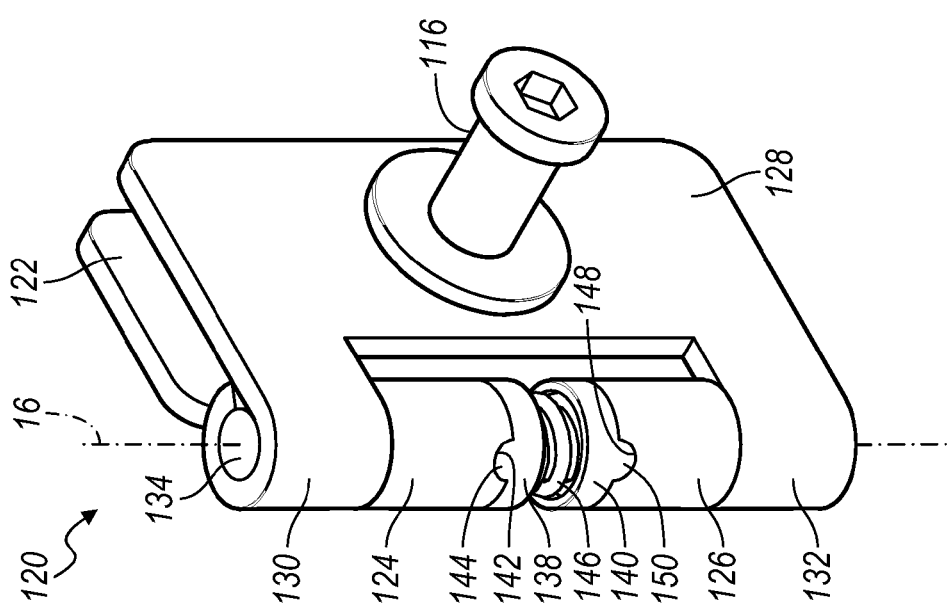
FIG. 6 is a perspective view of alternative dual action hinge/striker in its closed position.
Figure 8:
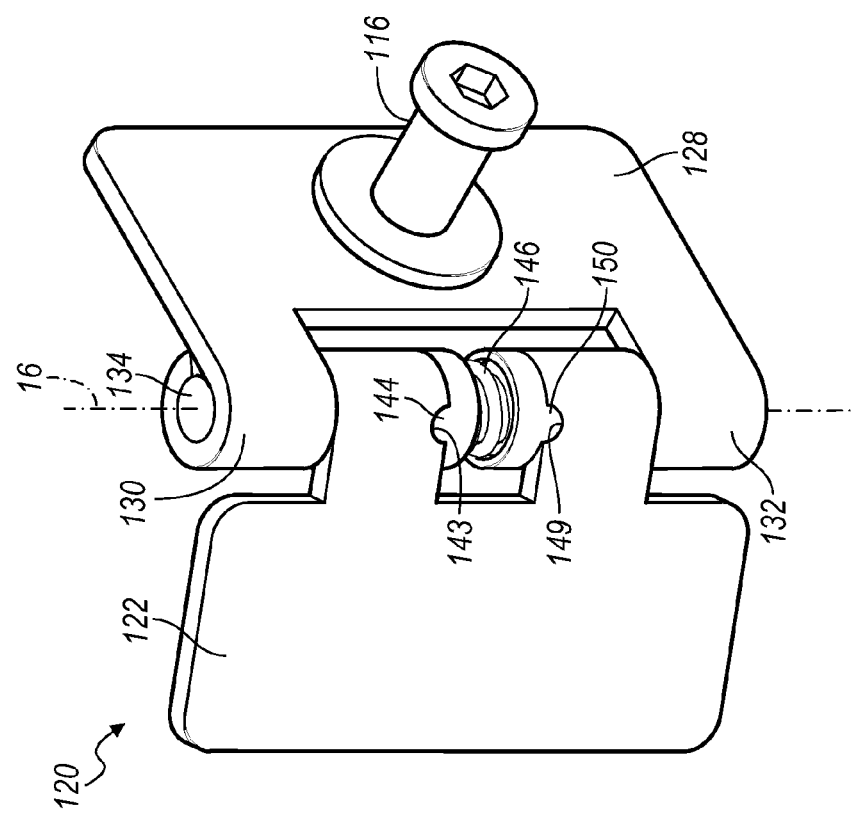
FIG. 8 is a perspective view of the dual action hinge/striker of FIG. 6 in its fully open position.

FIGS. 6, 7 and 8 illustrate a second embodiment of an upper hinge/striker 120, which includes a gate-side strap or plate 122, which is secured preferably by mechanical fasteners to the side leg 30 of tailgate 12 and is formed with spaced lugs 124, 126. Hinge/striker 120 further includes a body-side strap or plate 128, which is formed with spaced lugs 130, 132. Each lug 124, 126, 130, 132 is formed with a pin hole, into which is fitted a hinge pin 134. Hinge/striker 120 is installed in the vehicle at a higher elevation than dual action hinge 50 such that hinge pin 134 is aligned with axis 16 and pin 86. The outboard surface of plate 108 supports striker 116, which extends laterally toward post 22. Latch 118, secured to post 22, resiliently and releasably engages striker 116 with an elastic force. When latch 118 and striker 100 are engaged, endgate 12 is in its closed position and their engagement secures the endgate against pivoting.

An upper detent disc 138 and lower detent disc 140 are located between lugs 124, 126 and are each formed with a hole through which hinge pin 134 passes. The lower surface of lug 124 is formed with multiple recesses 142, 143 spaced angularly about the axis of hinge pin 134. The upper surface of disc 138 is formed with a projection 144, which is continually biased toward lug 124 by a compression spring 146, located between discs 138, 140. Similarly, the upper surface of lug 126 is formed with multiple recesses 148, 149 spaced angularly about the axis of hinge pin 134. The lower surface of disc 140 is formed with a projection 150, which is continually biased toward lug 126 by compression spring 146.

FIG. 7 shows the hinge/striker 120 having pivoted 90 degrees about axis 16 from the closed position of FIG. 6 to a partially open position. Projection 144 is disengaged from recess 142 and contacts the lower surfaces of disc 138 due to the force of spring 146. Projection 150 is disengaged from recess 148 and contacts the lower surfaces of disc 140.

FIG. 8 shows the hinge and striker 120 having pivoted about axis 16 from the closed position of FIG. 6 to a fully open position. Projection 144 is engaged with recess 143 and projection 150 is engaged with recess 149.

When hinge/striker 120 is in the position shown in FIG. 8, endgate 12 is fully open and the engagement of projections 138, 150 with recesses 143, 149, respectively, resists pivoting of the endgate about axis 16. The detent will release the endgate 12 allowing it to pivot about axis 16 toward the closed position upon application of a force of sufficient magnitude tending to close the endgate.

In operation, when a rearward force is applied to endgate 12, the endgate swings about lateral axis 14 to the open position shown in FIG. 1 due to its being supported on posts 20, 22 by dual action endgate hinges 50 located near the bottom of the posts.

Hinge/striker 120 is installed on one of the posts 20, 22 at a higher elevation than that of the endgate hinge 50 that is located on that post. Endgate 12 can also swing about upright axis 16 to the open position as a dual action endgate hinge 50 pivots about pin 86 and hinge/striker 120 pivots about its hinge pin 134. Or hinge/striker 100 is installed on one of the posts 20, 22 at a higher elevation than that of the endgate hinge 50 that is located on that post, in which case endgate 12 swings about upright axis 16 to the open position as a dual action endgate hinge 50 pivots about pin 86 and hinge/striker 100 pivots about its hinge pin 114.

Referring to FIGS. 9 and 10, a dual action hinge/catch assembly 156 is preferably installed in the vehicle 10 on or near the base of one of the posts 20, 22. In this position the hinge/catch assembly 156 is covered by endgate 12 when the endgate is closed.

The dual action hinge/catch assembly 156 comprises a pivot support 158 and a pivot 160, which is alternately engaged with and disengaged from pivot support 158. The pivot support 158 includes a hollow cylinder 162 aligned with lateral axis 14 and having a closed end 164; a compression spring 166 located in cylinder 162 and contacting the cylinder end 164; a mounting plate 168, which is secured to cylinder 162 and to the vehicle body at post 20; a partial cylindrical receptacle 170, secured to plate 168 and substantially aligned with lateral axis 14; and a plunger 172, fitted in cylinder 162 and biased rightward along axis 14 by the force of spring 166.

The pivot 160 of the hinge/catch assembly 156 includes a mounting plate 174, which is secured to the endgate 12 at a surface similar to side leg 30; and a cylinder 176, which is aligned with lateral axis 14 and has a recess 178 at the end facing pivot support 158. Recess 178 is aligned with and sized to engage the plunger 172.

In operation, the left side of endgate 12 is supported about lateral axis 14 on post 20 by engaging cylinder 176 in receptacle 170, as shown in FIG. 10. As cylinder 176 enters receptacle 170 by swinging about upright axis 16 to the closed position, plunger 172 is forced to retract within cylinder 162 against the force of spring 166 due to the plunger contacting cylinder 176. When cylinder 176 is seated in receptacle 170, plunger 172 is forced outward in response to the force of spring 166 and into engagement with the recess 178 on cylinder 176. This engagement catches and holds cylinder 176 and the left side of endgate 12 in the pivot support 158. In this way, the hinge/catch assembly 156 supports the endgate 12 for pivoting about lateral axis 14 and resists disengagement of the endgate from post 20.

When a rearward force is applied to endgate 12, the endgate swings about lateral axis 14 to the open position shown in FIG. 1 due to its being supported on post 22 by the dual action endgate hinge 50 and on post 20 by the hinge/catch 156. Endgate 12 can also swing about axis 16 on either post 20 or 22 to the open position as the endgate hinge 50 pivots about pin 86 and hinge/striker 120 pivots about its hinge pin 134, or hinge/striker 100 pivots about its hinge pin 114.

Although the term "endgate" has been used in this description, the invention is applicable also to a tailgate hinged at the top to open downward, to a lift gate or hatch hinged at the top to open upward, and to a door hinged at the side for convenience in loading or unloading cargo. While certain embodiments of the present invention have been described in detail, those familiar with the art to which this invention relates will recognize various alternative designs and embodiments for practicing the invention as defined by the following claims.

What is claimed is:

1. An assembly for opening and closing a passageway into the body of a vehicle comprising:
   a first post secured to the body at a lateral side of the passageway;
   an endgate for opening and closing the passageway and able to swing alternately about a lateral axis and an upright axis;
   a pivot support secured to the first post and aligned with the lateral axis;
   a pivot secured to the endgate and aligned with the lateral axis, for alternately engaging and disengaging the pivot support, said engagement supporting the endgate for pivoting about the lateral axis, said disengagement permitting the endgate to pivot about the upright axis; and wherein the pivot support further includes a detent plunger, a spring, a first cylinder secured to the first post, aligned with the lateral axis and containing the detent plunger and the spring, the spring urging the plunger toward an end of the cylinder that faces the pivot, and a receptacle secured to the first post for receiving and supporting the pivot therein; and the pivot further includes a second cylinder secured to the endgate and formed with a detent recess, the second cylinder being engageable with the receptacle as the endgate pivots to a closed position about the upright axis, the plunger engaging the recess when the second cylinder is received in the receptacle.

2. The assembly of claim 1 wherein the pivot support and pivot include a detent mechanism that resists disengagement of the pivot from the pivot support.

3. The assembly of claim 1, wherein the lateral axis is located in a horizontal plane and the upright axis is located in a vertical plane.

4. An assembly for opening and closing a passageway into the body of a vehicle comprising:
- a first post secured to the body at a lateral side of the passageway;
- a second post secured to the body at a lateral side of the passageway opposite the first post;
- an endgate for opening and closing the passageway and able to swing alternately about a lateral axis and an upright axis;
- a pivot support secured to the first post and aligned with the lateral axis;
- a pivot secured to the endgate and aligned with the lateral axis, for alternately engaging and disengaging the pivot support, said engagement supporting the endgate for pivoting about the lateral axis, said disengagement permitting the endgate to pivot about the upright axis;
- a dual action hinge secured to the endgate and the second post, including a first hinge pin aligned with the lateral axis and supporting the endgate for pivoting about the lateral axis, and a second hinge pin aligned with the upright axis and supporting the endgate for pivoting about the upright axis; and
- wherein the pivot support further includes a detent plunger, a spring, a first cylinder secured to the first post, aligned with the lateral axis and containing the detent plunger and the spring, the spring urging the plunger toward an end of the cylinder that faces the pivot, and a receptacle secured to the first post for receiving and supporting the pivot therein; and the pivot further includes a second cylinder secured to the endgate and formed with a detent recess, the second cylinder being engageable with the receptacle as the endgate pivots to a closed position about the upright axis, the plunger engaging the recess when the second cylinder is received in the receptacle.

5. The assembly of claim 4 wherein the pivot support and pivot include a detent mechanism that resists disengagement of the pivot from the pivot support.

6. The assembly of claim 4 wherein the lateral axis is located in a horizontal plane and the upright axis is located in a vertical plane.

7. An assembly for opening and closing a passageway into the body of a vehicle comprising:
- a first post secured to the body at a lateral side of the passageway;
- an endgate for opening and closing the passageway and able to swing alternately about a lateral axis and an upright axis;
- a pivot support secured to the first post and aligned with the lateral axis;
- a pivot secured to the endgate and aligned with the lateral axis, for alternately engaging and disengaging the pivot support, said engagement supporting the endgate for pivoting about the lateral axis, said disengagement permitting the endgate to pivot about the upright axis; and
- wherein the pivot support further includes a first mounting plate secured to the first post, a detent plunger, a spring, a first cylinder secured to the first mounting plate, aligned with the lateral axis and containing the detent plunger and the spring, the spring urging the plunger toward an end of the cylinder that faces the pivot, and a receptacle secured to the first mounting plate, the receptacle receiving and supporting the pivot therein; and the pivot further includes a second mounting plate secured to the endgate, a second cylinder secured to the second mounting plate and formed with a detent recess, the second cylinder being engageable with the receptacle as the endgate pivots to a closed position about the upright axis, the plunger engaging the recess when the second cylinder is received in the receptacle.

8. The assembly of claim 7 including a second post secured to the body at a lateral side of the passageway opposite the first post, and a dual action hinge secured to the endgate and the second post, including a first hinge pin aligned with the lateral axis and supporting the endgate for pivoting about the lateral axis, and a second hinge pin aligned with the upright axis and supporting the endgate for pivoting about the upright axis.

* * * * *